US006922959B1

(12) United States Patent
Hileman

(10) Patent No.: US 6,922,959 B1
(45) Date of Patent: Aug. 2, 2005

(54) APPARATUS AND METHOD FOR CORRECTING A MISALIGNED DOOR AND DOOR FRAME

(76) Inventor: William Hileman, 239 Honeywood St., Henderson, NV (US) 89074

( * ) Notice: Subject to any disclaimer, the term of this patent is extended or adjusted under 35 U.S.C. 154(b) by 31 days.

(21) Appl. No.: 10/350,977

(22) Filed: Jan. 24, 2003

(51) Int. Cl.[7] .............................. E06B 1/04; B60J 5/00
(52) U.S. Cl. .......................... 52/212; 52/749.1; 49/462
(58) Field of Search ............................... 52/749.1, 212, 52/720.1, 730.1, 731.7, 745.16, 291, 656.4, 716.8; 49/462

(56) References Cited

U.S. PATENT DOCUMENTS

| | | | | |
|---|---|---|---|---|
| 899,259 A | | 9/1908 | Ohnstrand | |
| 908,858 A | | 1/1909 | Goddard | |
| 1,574,563 A | * | 2/1926 | Duff | 52/731.4 |
| 4,141,192 A | * | 2/1979 | Augustine | 52/749.1 |
| 4,510,722 A | | 4/1985 | van Wieringen | |
| 4,719,729 A | * | 1/1988 | Wynar | 52/211 |
| 4,768,320 A | * | 9/1988 | Weller | 52/211 |
| 4,791,758 A | * | 12/1988 | Bauer et al. | 49/505 |
| 5,070,651 A | | 12/1991 | Jeter | |
| 5,187,898 A | | 2/1993 | McKann | |
| 5,345,722 A | | 9/1994 | McKann | |
| 5,412,909 A | | 5/1995 | Wu | |
| 5,488,804 A | * | 2/1996 | Batscher | 52/717.05 |
| 5,619,823 A | * | 4/1997 | Ruff et al. | 49/504 |
| 5,737,878 A | * | 4/1998 | Raulerson et al. | 49/462 |
| 5,775,045 A | * | 7/1998 | Hill | 52/211 |
| 6,266,933 B1 | * | 7/2001 | Park | 52/210 |
| 6,293,060 B1 | | 9/2001 | McKann et al. | |
| 6,357,187 B1 | * | 3/2002 | Haldeman | 52/211 |
| 6,526,708 B1 | * | 3/2003 | Hartley et al. | 52/211 |

* cited by examiner

*Primary Examiner*—Anita M. King
(74) *Attorney, Agent, or Firm*—Rob L. Phillips; Quirk & Tratos

(57) ABSTRACT

A vertical and horizontal member are designed to encase a portion of an installed doorframe assembly. In particular, the vertical and horizontal member encase a door stop section of a horizontal and vertical door frame section. Channels defined by the members are wider than the pre-existing door stop sections such that the member may be laterally positioned thereover to eliminate any misalignment between a door and a door frame assembly. Once properly positioned, the members are secured to the doorframe assembly thereby eliminating any misalignment between the door and the door frame assembly.

11 Claims, 3 Drawing Sheets

APPARATUS AND METHOD FOR CORRECTING A MISALIGNED DOOR AND DOOR FRAME

FIELD OF THE INVENTION

The embodiments of the present invention relate generally to doors and door frames. More particularly, an apparatus and method for retrofitting an existing door frame to correct misalignment between the door and the door frame.

BACKGROUND OF THE INVENTION

Installed door frames and/or corresponding doors can, over time, change configuration for any number of reasons. For example, a wall structure, supporting a door frame, may twist due to moisture or a door may warp due to external elements, including temperature and humidity. Moreover, misalignment may be the result of poor workmanship related to installation of the door or door frame. Upon such an occurrence, the cooperation between the door and the door frame, namely a door stop, becomes misaligned. As such, when the door is in a closed position, areas of the door become unsuitably distanced from the door stop. The distance not only violates building and safety codes, it can result in unnecessary injuries and damage. Additionally, the misalignment may prevent the proper operation of the door and is unsightly as well.

One measure of the cooperation between a door and a door frame is the ability of the door and door frame to prevent smoke and fire from passing from a fire area, on a first side of the door, to a non-fire area on a second side of the door. When the door or door frame change configuration, the cooperation is impaired thereby allowing smoke and fire to pass more freely from a fire area to a non-fire area. Heretofore, such instances of misalignment were corrected by replacing the door, the door frame or both. However, both the replacement of the door and door frame are expensive and time consuming. Thus, there is a need for an easy and cost effective method for correcting misalignment between a door and door frame.

SUMMARY OF THE INVENTION

Accordingly, the embodiments of the present invention include two U-shaped members designed to encase a portion of an existing, previously installed, door frame. A door frame comprises two parallel vertical sections and an upper horizontal section that joins the two parallel vertical sections at their upper ends. When in place, the door frame defines an opening for receipt of a door. A first edge of the door is hinged to a first vertical section of the door frame such that the door rotates freely about the hinges. Each section of the door frame includes a door stop section running along a central portion thereof. When the door frame is in place, the door stop sections form a door stop which prevents the door from rotating entirely through the defined opening.

A second vertical section includes a door jamb, adjacent to the door stop section thereon, for receipt of a door latch mechanism for closing and opening the door. A turn of a door handle acts to remove the door latch from the door jamb thereby allowing the door to be opened.

A horizontal U-shaped member of the embodiments of the present invention is used to encase the door stop section corresponding to the upper horizontal door frame section. The horizontal U-shaped member is tapered from a first end to a second end to facilitate the continued operation of a subject door upon installation. The smaller first end of the tapered U-shaped member is positioned adjacent the hinged edge of the door along the upper horizontal door frame section such that it encases the door stop section. As the horizontal U-shaped member extends to the second end, its channel width increases. The channel width is greater than a width of the door stop section thereby allowing the U-shaped member to be laterally positioned thereover. The width along its length allows the horizontal U-shaped member to be properly positioned such that the configuration of the upper door stop section is altered to account for any misalignment between the upper door stop section and an upper edge of the door.

The horizontal U-shaped member is tapered to account for the increase in the degree of misalignment that may occur between the door and door stop as one traverses the width of the door from the hinged edge to the opposite edge. Typically, the degree of misalignment is minimal near the hinged edge of the door and the upper horizontal door frame section.

A vertical U-shaped member of the embodiments of the present invention is used to encase the door stop section corresponding to a vertical door frame section, namely the vertical door frame section opposite the vertical door frame section supporting the hinged door. Similar to the horizontal U-shaped member, the vertical U-shaped member is properly positioned such that the configuration of the vertical door stop section is altered to account for any misalignment between the vertical door stop section and a leading edge of the door.

Once the horizontal and vertical U-shaped members are properly positioned, they are permanently attached to the door frame. In a first embodiment, the two U-shaped members are secured to the door frame, namely the existing door stop. Any known connections means including nails, screws, bolts, welds or adhesives may be used.

DETAILED DESCRIPTION OF THE INVENTION

Figures 1, 2, 3:
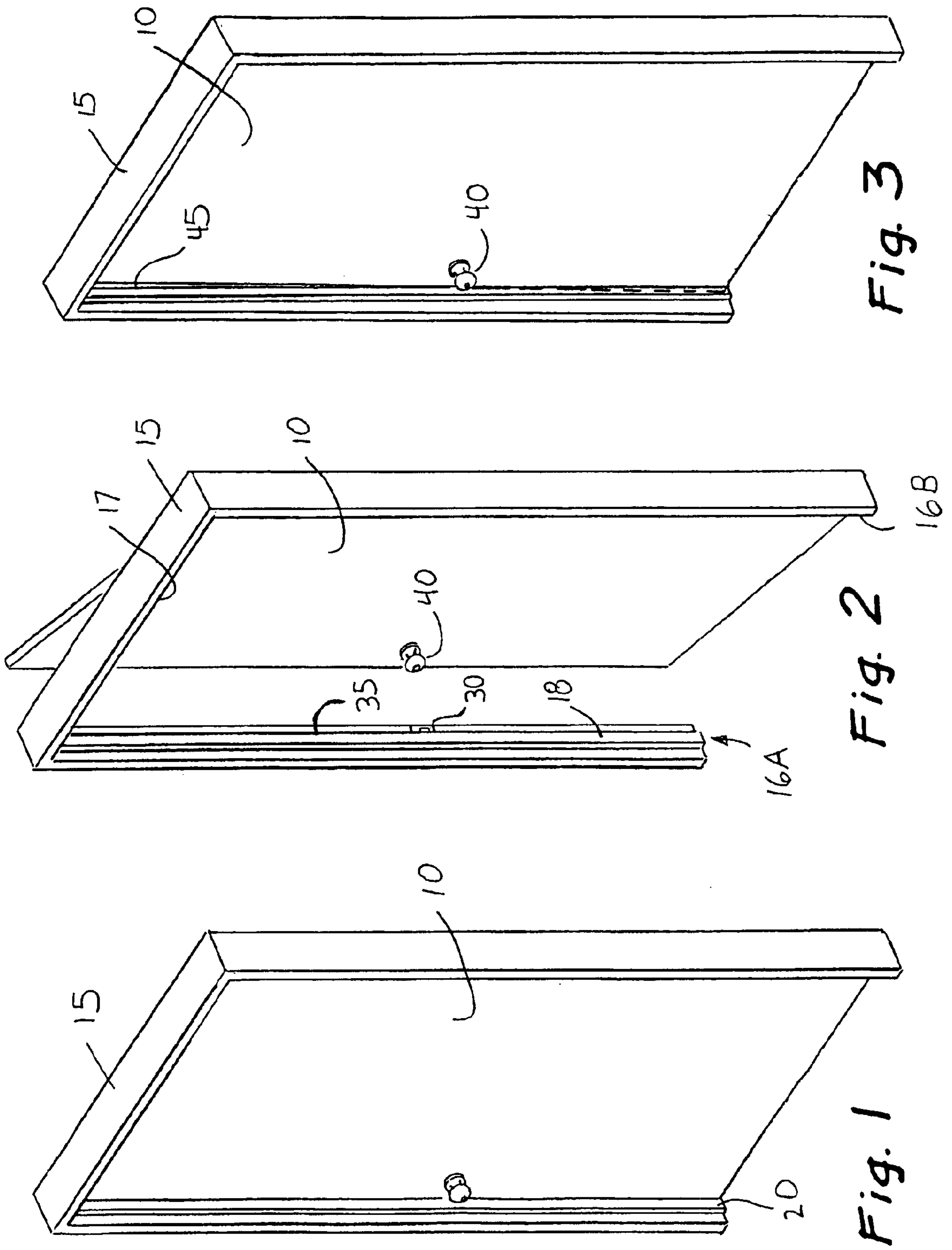
FIG. 1 is a perspective view of a properly aligned door and door frame in a closed position.
FIG. 2 is a perspective view of a properly aligned door in an open position.
FIG. 3 is a perspective view of a misaligned door and door frame.

Reference is now made to the figures wherein like parts are referred to by like numerals throughout. FIG. 1 shows a properly aligned door 10 and door frame assembly 15, including a door stop 20, with the door 10 in a closed position. The door 10 is attached to the door frame assembly 15 by means of multiple hinges. As shown in FIG. 2, in the closed position, a door latch 30 is positioned for receipt by a door jamb 35 secured to the door frame assembly 20. A handle 40 controls lateral movement of the door latch 30 which allows the door 10 to be opened and closed.

The door frame assembly 15 is comprised of two parallel vertical sections 16A, 16B and a horizontal section 17.

While the vertical sections 16A, 16B and horizontal section, 17 can be fabricated of any fire resistant material, including fiberglass or special plastics, steel is often used since it meets building and safety code regulations. Each of the vertical sections 16A, 16B and the horizontal section 17 includes a door stop section 18 having identical cross-sectional dimensions. When the door frame sections are in place, the individual door stop sections 18 constitute a complete door stop 20 that acts to prevent the door 10 from traversing through an opening defined by the door frame assembly 15.

Now referring to FIG. 3, as the door 10 and doorframe assembly 15 become misaligned they precipitate an unsuitable space 45 between the door 10 and the door stop 20. The space 45 decreases the ability of the door 10 to prevent fire and smoke from passing from a fire area on a first side of the door to a non-fire area on a second side of the door 10. Moreover, the ability to properly open and close the door 10 can be affected should the misalignment of the door 10 and door frame assembly 15 alter the respective positions of the door latch 30 and doorjamb 35. Cosmetically, the space 45 is also unsightly.

In fact, commercial and residential doors are fire tested to ensure they meet minimum standards and to rate their overall effectiveness. One such fire testing company is Wamock Hershey. The fire test focuses on the entire door assembly including the door 10, door hinges (not shown), door frame assembly 15, door handle 40 and door jamb 35. For a misaligned door 10 and door frame assembly 15, the results of the test would be poor as fire and smoke would hurriedly pass through the space 45 between the misaligned door 10 and door frame assembly 15. Thus, the ability to quickly and inexpensively correct misalignments between the door 10 and the door frame assembly 15 is paramount to at least ensure that building and safety codes are adhered to and to protect the public from unnecessary fire damage and injuries.

Figure 4:
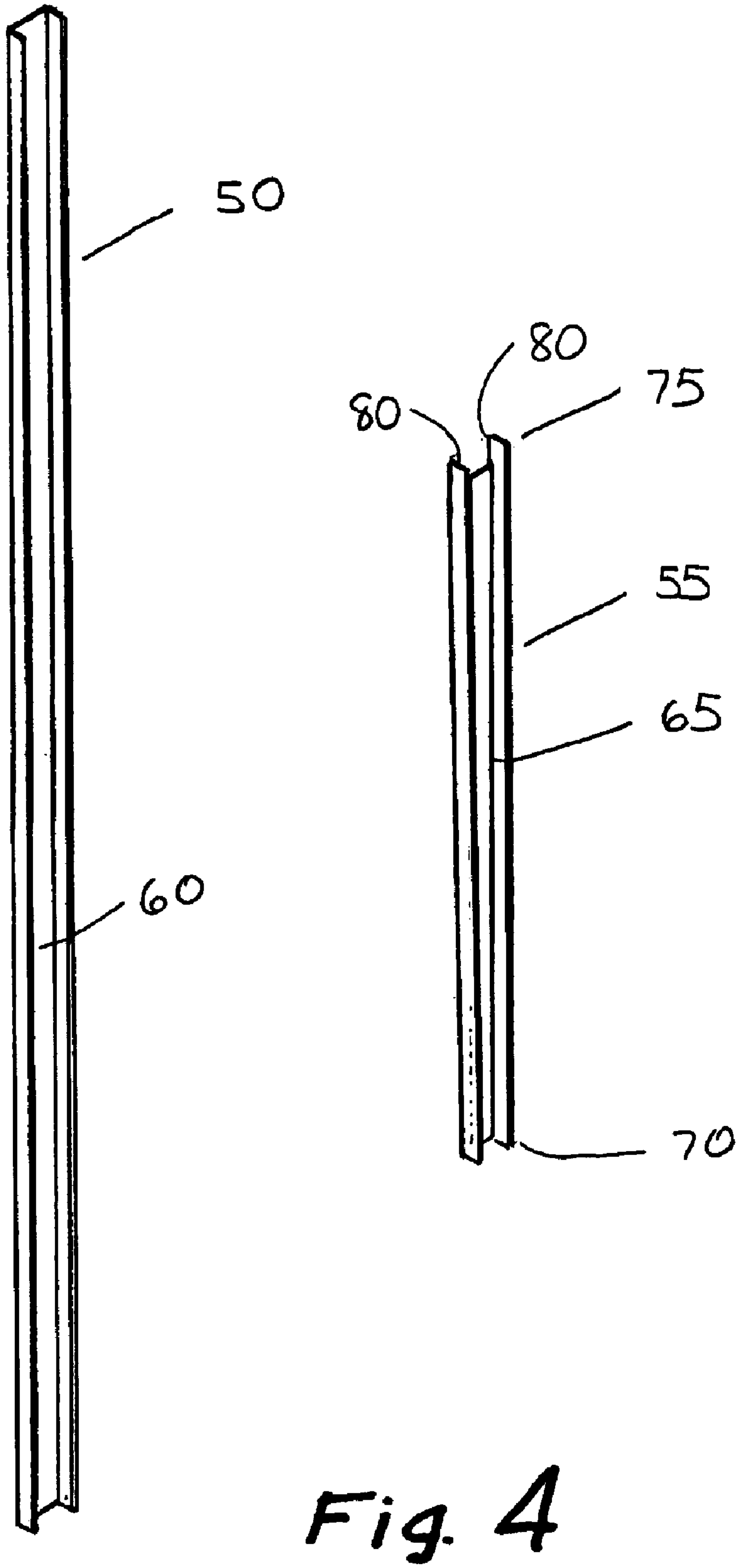
FIG. 4 is a perspective view of a U-shaped horizontal and vertical members of the embodiments of present invention.

FIG. 4 illustrates a U-shaped vertical horizontal member 50 and a U-shaped horizontal vertical member 55 of a first embodiment of the present invention. A length of the vertical member 50 is generally equivalent to a height of a subject door frame assembly and a length of the horizontal member 55 is generally equivalent to a width of a subject door frame assembly. While the vertical member 50 and horizontal member 55 may be manufactured of any height and width respectively, most door frame assemblies are fabricated pursuant to standard door heights and widths. For example, one standard door size is 3' by 7'. Although other materials may be used, the vertical member 50 and horizontal member 55 are typically fabricated of metal, such as steel, in accordance with most building and safety codes.

A width and depth of a channel 60 defined by the vertical member 50 is constant along the length of the vertical member 50. The depth of the channel 60 is generally equivalent to a height of the door stop 20. Similarly, a depth of a channel 65 defined by the horizontal member 55 is generally equivalent to the height of the door stop 20. Contrarily, a width of the channel 65 is tapered along the length of the horizontal member 55 for reasons described below.

Figure 5:
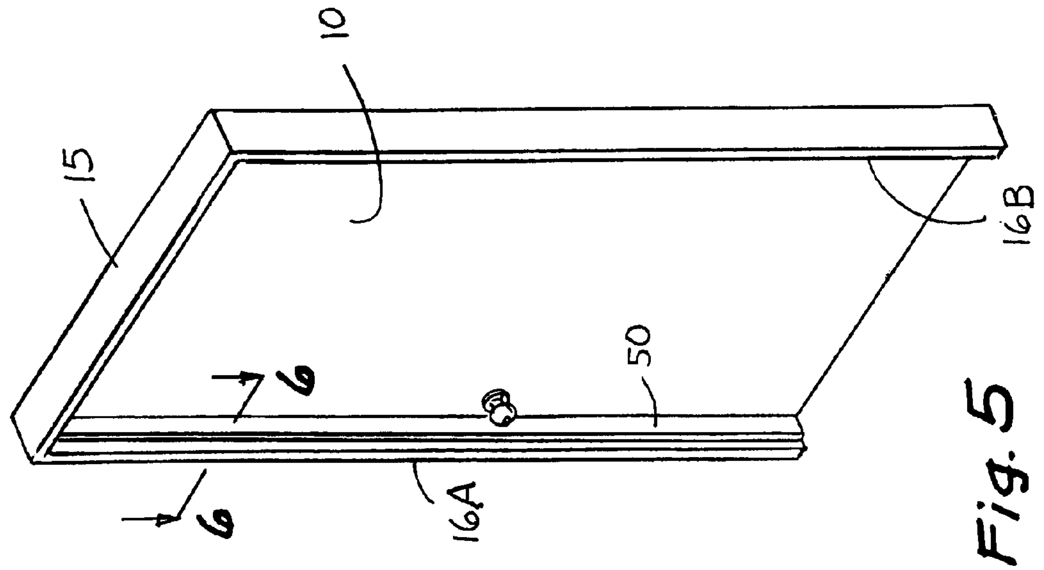
FIG. 5 is a perspective view of the U-shaped horizontal and vertical members of the embodiments of the present invention affixed to a door frame.

FIG. 5 illustrates the vertical and horizontal members 50, 55 secured to a door frame assembly 15. Although numerous attachment means are available, rivets, screws, nails, clamps, welds and adhesives are a few specific means that may be used to secure the vertical and horizontal members 50, 55 to the door frame assembly 15. The channel 60 of the vertical member 50 is designed to encase the door stop section 18 running along the height of the vertical door frame section 16A. The width of the channel 60 is wider than the width of the door stop section 18 so that the vertical member 50 may be laterally positioned thereover accordingly. The vertical member 50 is positioned to eliminate any space 45 between the door 10 and the door stop section 18 running along the height of the vertical door frame section 16A. Once properly positioned, the vertical member 50 is attached to the door frame section 16A.

From a first end 70 to a second end 75, a width of the channel 65 increases. The width of the first end 70 can be limited since the degree of any misalignment between the door 10 and the doorframe assembly 15 near the fixed hinged connection therebetween is slight. However, the second end 75 is wider to account for greater degrees of misalignment between the door 10 and the door frame assembly 15 near an opening/closing or leading edge of the door 10.

The second end 75 of the horizontal member 55 includes oppositely positioned projections 80. The projections 80 are continuations of walls 85 of the channel 65. Similar to the vertical member 50, the horizontal member 55 is designed to encase the door stop section 18 running along the length of the horizontal door frame section 17. The horizontal member 55 is positioned such that the first end 70 of the channel 65 encases the door stop section 18 near the fixed hinged connection between the door 10 and the door frame assembly 15 and the second end 75 encases the door stop section 18 near the opening/closing or leading edge of the door 10. A space defined by the projections 80 envelop the first vertical member 50 which is secured in place initially. In this manner, a continuous new doorstop is created thereby alleviating the disadvantages of the misalignment between the original door stop 20 and door.

Figure 6:
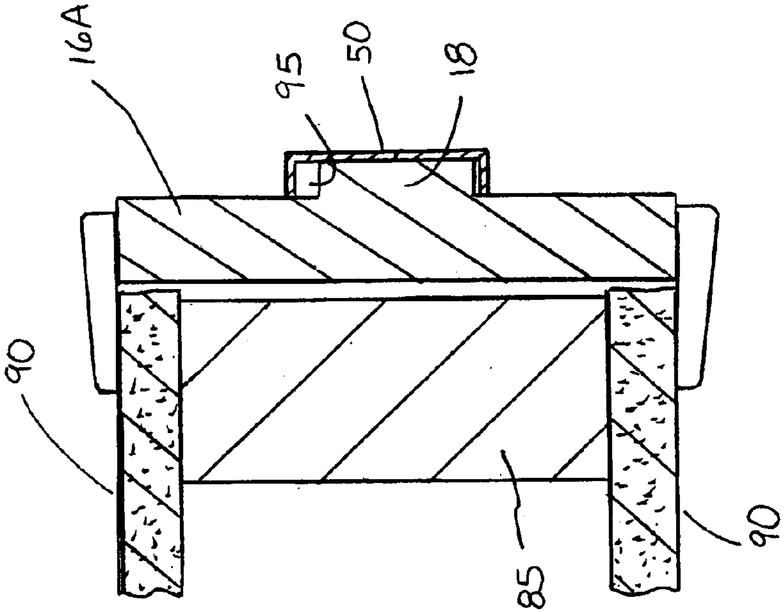
FIG. 6 is a cross-sectional view of an installed vertical member of the embodiments of the present invention.

FIG. 6 shows a cross-section view of the vertical member 50 once installed. A wooden frame member 85 supports building walls 90. Typically, the building walls 90 are fabricated of drywall or the like. The vertical door frame section 16A is then installed and supported by the building walls 90. As set forth above, the door frame member 16A is ideally metal. The vertical member 50 is shown encasing the door stop section 18 such that the position of the vertical member 50 eliminates any misalignment between a door (not shown) and the door stop section 18. Once the vertical member 50 is positioned properly it is attached to the door frame section 16A. The horizontal member 55 is then positioned and attached in a similar manner to the horizontal door frame section 17.

Although the invention has been described in detail with reference to various embodiments, additional variations and modifications exist within the scope and spirit of the invention as described and defined in the following claims.

I claim:

1. A retrofit door stop for an installed door frame assembly, comprising:

a vertical elongated member defining a first channel, said first channel having a depth and width sufficient for allowing the vertical elongated member to encase an existing vertical door stop section and to further be adjusted laterally about said existing vertical door stop section prior to attachment to the door frame assembly; and a horizontal elongated member defining a second channel, said second channel having a depth and width sufficient for allowing the horizontal elongated member to encase an existing horizontal door stop section and to further be adjusted laterally about said existing horizontal door stop member prior to attachment to the door frame assembly, said second channel having a tapered width along its length such that a first end of the channel is wider than a second end.

2. The retrofit door stop of claim 1 wherein the second end of the tapered horizontal elongated member having the smaller width is positioned adjacent an existing vertical door frame section supporting a door by hinges.

3. The retrofit door stop of claim 1 wherein said horizontal elongated member further includes two spaced projections at one end for engaging the width of said vertical elongated member upon installation.

4. The retrofit door stop of claim 1 wherein said vertical and horizontal elongated members are attached to an installed door frame assembly by means of rivets.

5. The retrofit door stop of claim 1 wherein said vertical and horizontal elongated members are attached to an installed door frame assembly by means of an adhesive.

6. An apparatus for correcting misalignment between an installed door frame assembly, namely a door stop, and door comprising:

a first elongated member defining a channel for encasing a vertical door stop section of the installed door frame assembly, said channel having a sufficient width for allowing the first elongated member to be laterally positioned prior to attachment of the first elongated member to the door frame; and a second elongated member defining a channel for encasing a horizontal door stop section of the installed door frame assembly, said channel having a tapered width along its length such that a first end of the channel is wider than a second end and having a sufficient width for allowing the second elongated member to be laterally positioned prior to attachment of the second elongated member to the door frame.

7. The retrofit door stop of claim 6 wherein the second end of the tapered second elongated member having the smaller width is positioned adjacent an existing vertical door frame section supporting a door by hinges.

8. The retrofit door stop of claim 5 wherein said second elongated member further includes two spaced projections at one end for engaging the width of said first elongated member at an upper end thereof upon installation.

9. A method of retrofitting a door frame assembly having a door stop comprising the steps of:

positioning a vertical elongated member defining a channel over a vertical door stop section of an installed door frame assembly such that any misalignment between the installed door frame assembly and door is eliminated;

attaching said vertical elongated member to the installed door frame assembly;

positioning a horizontal elongated member defining a channel over a horizontal door stop section of the installed door frame assembly such that any misalignment between the installed door frame assembly and door is eliminated, said channel having a tapered width along its length such that a first end of the channel is wider than a second end; and attaching said horizontal elongated member to the installed door frame.

10. The method of claim 9 further comprising positioning said horizontal elongated member such that two spaced projections at one end of the horizontal elongated member engage the width at an upper end of said vertical elongated member.

11. The method of claim 9 further comprising positioning the second end of said horizontal elongated member nearest the vertical door stop section supporting a door by hinges.

* * * * *